United States Patent
DeMoore et al.

(10) Patent No.: US 8,794,147 B2
(45) Date of Patent: Aug. 5, 2014

(54) ANTI-MARKING JACKETS COMPRISED OF FLUOROPOLYMER AND METHODS OF USING IN OFFSET PRINTING

(71) Applicant: Printing Research, Inc., Dallas, TX (US)

(72) Inventors: Howard W. DeMoore, Dallas, TX (US); Joey V. Le, Arlington, TX (US)

(73) Assignee: Printing Research, Inc., Dallas, TX (US)

( * ) Notice: Subject to any disclaimer, the term of this patent is extended or adjusted under 35 U.S.C. 154(b) by 0 days.

(21) Appl. No.: 13/769,543

(22) Filed: Feb. 18, 2013

(65) Prior Publication Data
US 2013/0152810 A1    Jun. 20, 2013

Related U.S. Application Data

(63) Continuation of application No. 13/603,413, filed on Sep. 4, 2012, now Pat. No. 8,397,634, which is a continuation of application No. 12/343,481, filed on Dec. 24, 2008, now Pat. No. 8,281,716.

(51) Int. Cl.
*B41C 3/08* (2006.01)
*B41F 22/00* (2006.01)

(52) U.S. Cl.
CPC ...................... *B41F 22/00* (2013.01)
USPC ...................... 101/401.1; 101/415.1

(58) Field of Classification Search
CPC ....................................... B41F 22/00
USPC ....................................... 101/401.1
See application file for complete search history.

(56) References Cited

U.S. PATENT DOCUMENTS

| | | | |
|---|---|---|---|
| 3,533,355 A | 10/1970 | Wall | |
| 3,791,644 A | 2/1974 | DeMoore | |
| 3,835,778 A | 9/1974 | Bock | |
| 3,960,081 A | 6/1976 | Gustavs et al. | |
| 4,133,264 A | 1/1979 | Fermi et al. | |
| 4,301,878 A | 11/1981 | Soe | |
| 4,402,267 A | 9/1983 | DeMoore | |
| 4,552,631 A | 11/1985 | Bissot et al. | |
| 4,724,762 A | 2/1988 | Jeschke et al. | |
| 4,761,324 A | 8/1988 | Rautenberg et al. | |
| 4,860,650 A | 8/1989 | Houser | |
| 4,894,112 A | 1/1990 | Lippman | |

(Continued)

FOREIGN PATENT DOCUMENTS

EP    1332873 B1    12/2005

OTHER PUBLICATIONS

Foreign Communication From a Related Counterpart Application—International Search Report and Written Opinion, PCT/US2009/068311, Mar. 11, 2010.

(Continued)

*Primary Examiner* — Anthony Nguyen (57) ABSTRACT

In a printing press having a transfer cylinder for transferring a freshly printed substrate, an anti-marking device is provided. The anti-marking device comprises a flexible jacket comprised of fluoropolymer to engage the freshly printed substrate as it is transferred over the transfer cylinder, the anti-marking device removably attached with free play to the transfer cylinder. In an embodiment, a base cover is installed on the transfer cylinder between the anti-marking device and the transfer cylinder.

12 Claims, 7 Drawing Sheets

(56) References Cited

U.S. PATENT DOCUMENTS

| | | |
|---|---|---|
| 5,046,421 A | 9/1991 | DeMoore |
| 5,065,122 A | 11/1991 | Juskey et al. |
| 5,323,702 A | 6/1994 | Vrotacoe et al. |
| 5,384,019 A | 1/1995 | Keating et al. |
| 5,396,841 A | 3/1995 | Güls |
| 5,406,314 A * | 4/1995 | Kuehnle ............... 347/115 |
| 5,511,480 A | 4/1996 | DeMoore et al. |
| 5,549,966 A | 8/1996 | Sassa |
| 5,603,264 A | 2/1997 | DeMoore et al. |
| 5,635,124 A | 6/1997 | Abrams et al. |
| 5,667,611 A | 9/1997 | Sassa |
| 5,768,990 A | 6/1998 | Vrotacoe et al. |
| 5,785,105 A | 7/1998 | Crider et al. |
| 5,842,412 A * | 12/1998 | Greenway et al. ............ 101/420 |
| 5,842,419 A | 12/1998 | Puschnerat |
| 5,907,998 A | 6/1999 | DeMoore et al. |
| 5,918,317 A | 7/1999 | Bernhardt |
| 5,957,421 A | 9/1999 | Barbour |
| 5,979,322 A | 11/1999 | DeMoore et al. |
| 6,073,556 A | 6/2000 | DeMoore et al. |
| 6,119,597 A | 9/2000 | DeMoore et al. |
| 6,192,800 B1 | 2/2001 | DeMoore et al. |
| 6,223,799 B1 * | 5/2001 | Johnstone ............... 156/542 |
| 6,244,178 B1 | 6/2001 | DeMoore et al. |
| 6,393,249 B1 | 5/2002 | Aslam et al. |
| D463,134 S | 9/2002 | Vosbikian |
| 6,568,325 B2 * | 5/2003 | Sawada et al. ............ 101/459 |
| 6,647,237 B2 | 11/2003 | Schlueter, Jr. et al. |
| 6,878,413 B2 * | 4/2005 | Frazzitta et al. ............ 427/494 |
| 6,901,859 B2 | 6/2005 | Yokoyama |
| 6,984,830 B2 * | 1/2006 | Burgio ............... 250/492.1 |
| 7,021,210 B2 | 4/2006 | Elliott et al. |
| RE39,305 E | 9/2006 | DeMoore et al. |
| 7,270,873 B2 | 9/2007 | Rizika et al. |
| 7,403,594 B2 | 7/2008 | Endo et al. |
| 7,438,115 B2 | 10/2008 | Bohlen |
| 7,478,592 B2 | 1/2009 | Zahnd et al. |
| 7,593,234 B2 | 9/2009 | Okuda |
| 8,146,497 B2 | 4/2012 | Caliari |
| 8,166,878 B2 * | 5/2012 | Saito ............... 101/424.1 |
| 8,220,338 B2 | 7/2012 | Tojo |
| 8,220,388 B2 | 7/2012 | DeMoore et al. |
| 8,281,716 B2 | 10/2012 | DeMoore et al. |
| 8,397,634 B2 | 3/2013 | DeMoore et al. |
| 8,424,453 B2 | 4/2013 | DeMoore |
| 2001/0042469 A1 | 11/2001 | Vosseler |
| 2002/0155289 A1 | 10/2002 | Cistone et al. |
| 2003/0113466 A1 | 6/2003 | Frazzitta et al. |
| 2003/0226461 A1 * | 12/2003 | Miller ............... 101/422 |
| 2004/0219358 A1 | 11/2004 | Tokarsky et al. |
| 2004/0259033 A1 | 12/2004 | Kunita |
| 2005/0212878 A1 | 9/2005 | Studer et al. |
| 2006/0249041 A1 | 11/2006 | DeMoore et al. |
| 2007/0202442 A1 | 8/2007 | Zwadlo |
| 2007/0207186 A1 | 9/2007 | Scanlon et al. |
| 2007/0227379 A1 | 10/2007 | Sato et al. |
| 2007/0261579 A1 | 11/2007 | Rizika |
| 2008/0026201 A1 | 1/2008 | Rizika et al. |
| 2008/0106001 A1 | 5/2008 | Slafer |
| 2010/0101441 A1 | 4/2010 | DeMoore et al. |
| 2010/0154665 A1 | 6/2010 | DeMoore et al. |
| 2010/0154667 A1 | 6/2010 | DeMoore et al. |
| 2010/0307357 A1 | 12/2010 | DeMoore |
| 2012/0048134 A1 | 3/2012 | DeMoore |
| 2012/0073463 A1 | 3/2012 | DeMoore |
| 2012/0152138 A1 | 6/2012 | DeMoore et al. |
| 2012/0192739 A1 | 8/2012 | DeMoore et al. |
| 2012/0192743 A1 | 8/2012 | DeMoore et al. |
| 2012/0325100 A1 | 12/2012 | DeMoore et al. |

OTHER PUBLICATIONS

Foreign Communication From a Related Counterpart Application—International Preliminary Report on Patentability, PCT/US2009/068311, Jul. 7, 2011.

Foreign Communication From a Related Counterpart Application—International Search Report and Written Opinion, PCT/US2009/061527, Dec. 22, 2009.

Foreign Communication From a Related Counterpart Application—International Preliminary Report on Patentability, PCT/US2009/061527, May 5, 2011.

Foreign Communication From a Related Counterpart Application—International Search Report and Written Opinion, PCT/US2012/023204, May 10, 2012.

Office Action Restriction dated Oct. 18, 2011, U.S. Appl. No. 12/343,481, filed Dec. 24, 2008.

Office Action dated Dec. 14, 2011, U.S. Appl. No. 12/343,481, filed Dec. 24, 2008.

Final Office Action dated May 16, 2012, U.S. Appl. No. 12/343,481, filed Dec. 24, 2008.

Notice of Allowance dated Jul. 18, 2012, U.S. Appl. No. 12/343,481, filed Dec. 24, 2008.

Office Action Restriction dated Aug. 21, 2012, U.S. Appl. No. 12/832,803, filed Jul. 8, 2010.

Office Action dated Nov. 8, 2012, U.S. Appl. No. 12/832,803, filed Jul. 8, 2010.

Final Office Action dated Apr. 11, 2013, U.S. Appl. No. 12/832,803, filed Jul. 8, 2010.

Notice of Allowance dated Nov. 2, 2012, U.S. Appl. No. 13/603,413, filed Sep. 4, 2012.

Office Action Restriction dated Nov. 4, 2011, U.S. Appl. No. 12/343,484, filed Dec. 24, 2008.

Office Action (Quayle Action) dated Dec. 13, 2011, U.S. Appl. No. 12/343,484, filed Dec. 24, 2008.

Notice of Allowance dated Mar. 23, 2012, U.S. Appl. No. 12/343,484, filed Dec. 24, 2008.

Supplemental Notice of Allowance dated Apr. 11, 2012, U.S. Appl. No. 12/343,484, filed Dec. 24, 2008.

Office Action Restriction dated Sep. 14, 2011, U.S. Appl. No. 12/258,225, filed Oct. 24, 2008.

Office Action dated Dec. 27, 2011, U.S. Appl. No. 12/258,225, filed Oct. 24, 2008.

Office Action dated Aug. 22, 2012, U.S. Appl. No. 12/874,154, filed Sep. 1, 2010.

Notice of Allowance dated Dec. 6, 2012, U.S. Appl. No. 12/874,154, filed Sep. 1, 2010.

Office Action—Restriction Requirement dated Apr. 17, 2013, U.S. Appl. No. 12/890,393, filed Sep. 24, 2010.

DeMoore, Howard, et al., Patent Application entitled "Beaded Partially Coated Ant-Marking Jackets," filed on May 2, 2012, U.S. Appl. No. 13/462,431.

DeMoore, Howard, et al., Patent Application entitled "Anti-marking jackets Comprised of Fluoropolymer and Methods of Using in Offset Printing," filed on Oct. 5, 2012, U.S. Appl. No. 13/646,657.

DeMoore, Howard, et al., Patent Application entitled "Anti-marking jackets Comprised of Fluoropolymer and Methods of Using in Offset Printing," filed on Feb. 20, 2013, U.S. Appl. No. 13/771,554.

Notice of Allowance dated Jul. 8, 2013, U.S. Appl. No. 12/832,803, filed Jul. 8, 2010.

Office Action dated Jul. 10, 2013, U.S. Appl. No. 12/890,393, filed Sep. 24, 2010.

Office Action—Restriction Requirement dated Jul. 8, 2013, U.S. Appl. No. 13/018,107, filed Jan. 31, 2011.

\* cited by examiner

ANTI-MARKING JACKETS COMPRISED OF FLUOROPOLYMER AND METHODS OF USING IN OFFSET PRINTING

CROSS-REFERENCE TO RELATED APPLICATIONS

This application is a continuation of and claims priority under 35 U.S.C. §120 to U.S. patent application Ser. No. 13/603,413, filed on Sep. 4, 2012, entitled "Anti-marking Jackets Comprised of Fluoropolymer and Methods of Using in Offset Printing," by Howard W. DeMoore, et al., which is a continuation of and claims priority under 35 U.S.C. §120 to U.S. patent application Ser. No. 12/343,481, filed on Dec. 24, 2008, entitled "Anti-marking Jackets Comprised of Fluoropolymer and Methods of Using in Offset Printing," by Howard W. DeMoore, et al., now U.S. Pat. No. 8,281,716 B2, issued Oct. 9, 2012, all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the operation of a rotary offset printing press, freshly printed substrates, such as sheets or web material, are guided by transfer cylinders or the like from one printing unit to another, and then they are delivered to a sheet stacker or to a sheet folder/cutter unit, respectively. As used herein, the term "transfer cylinder" includes delivery cylinders, transfer rollers, support rollers, support cylinders, delivery wheels, skeleton wheels, segmented wheels, transfer drums, support drums, spider wheels, support wheels, guide wheels, guide rollers, and the like.

The ink marking problems inherent in transferring freshly printed substrates have been longstanding. In order to minimize the contact area between the transfer means and the freshly printed substrate, conventional support wheels have been modified in the form of relatively thin disks having a toothed or serrated circumference, referred to as skeleton wheels. However, those thin disc transfer means have not overcome the problems of smearing and marking the freshly printed substrate due to moving contact between the freshly printed substrate and the projections or serrations. Moreover, the attempts to cover the transfer cylinder with a cover material and/or minimize the surface support area in contact with the freshly printed substrate material often resulted in further problems.

Various efforts have been made to overcome the limitations of thin disk skeleton wheels. One of the most important improvements has been completely contrary to the concept of minimizing the surface area of contact. That improvement is disclosed and claimed in U.S. Pat. No. 3,791,644 to Howard W. DeMoore, incorporated by reference herein in its entirety, wherein the support surface of a transfer cylinder in the form of a wide wheel or cylinder is coated with an improved ink repellent surface formed by a layer of polytetrafluoroethylene (PTFE).

During the use of the PTFE coated transfer cylinders in high-speed commercial printing presses, the surface of the coated cylinders must be washed frequently with a solvent to remove any ink accumulation. Moreover, it has also been determined that the PTFE coated cylinders do not provide a cushioning effect and relative movement, which are beneficial.

The limitations on the use of the PTFE coated transfer cylinders have been overcome with an improved transfer cylinder having an ink repellent, cushioning, and supportive fabric covering or the like for transferring the freshly printed sheet. It is now well recognized and accepted in the printing industry world-wide that marking and smearing of freshly printed sheets caused by engagement of the wet printed surface with the supporting surface of a conventional press transfer cylinder is substantially reduced by using the anti-marking fabric covering system as disclosed and claimed in my U.S. Pat. No. 4,402,267 entitled "Method and Apparatus for Handling Printed Sheet Material," the disclosure of which is incorporated herein by reference.

That system, which is marketed under license by Printing Research, Inc. of Dallas, Tex., U.S.A. under the registered trademark SUPER BLUE® includes the use of a low friction coating or coated material on the supporting surface of the transfer cylinder, and over which is loosely attached a movable fabric covering. The fabric covering provided a yieldable, cushioning support for the freshly printed side of the substrate such that relative movement between the freshly printed substrate and the transfer cylinder surface would take place between the fabric covering and the support surface of the transfer cylinder so that marking and smearing of the freshly printed surface was substantially reduced. Various improvements have been made to the SUPER BLUE® system, which are described in more detail in U.S. Pat. Nos. 5,907,998 and 6,244,178 each entitled "Anti-Static, Anti-Smearing Pre-Stretched and Pressed Flat, Precision-Cut Striped Flexible Coverings for Transfer Cylinders"; U.S. Pat. Nos. 5,511,480, 5,603,264, 6,073,556, 6,119,597, and 6,192,800 each entitled "Method and Apparatus for Handling Printed Sheet Material"; U.S. Pat. No. 5,979,322 entitled "Environmentally Safe, Ink Repellent, Anti-Marking Flexible Jacket Covering Having Alignment Stripes, Centering Marks and Pre-Fabricated Reinforcement Strips for Attachment onto Transfer Cylinders in a Printing Press"; and U.S. Pat. No. RE39,305 entitled "Anti-static, Anti-smearing Pre-stretched and Pressed Flat, Precision-cut Striped Flexible Coverings for Transfer Cylinders," each of which is hereby incorporated by reference herein in its entirety. The above cited patents are all owned by Printing Research, Inc. of Dallas, Tex., U.S.A.

SUMMARY

In an embodiment, in a printing press having a transfer cylinder for transferring a freshly printed substrate, an anti-marking device is disclosed. The anti-marking device comprises a flexible jacket comprised of fluoropolymer to engage the freshly printed substrate as it is transferred over the transfer cylinder, the flexible jacket removably attached with free play to the transfer cylinder.

In another embodiment, a method of maintaining a printing press is disclosed. The method comprises removing a flexible jacket from the transfer cylinder, wherein the flexible jacket comprises fluoropolymer and immersing the flexible jacket in a solvent to clean. The method further includes attaching the flexible jacket to the transfer cylinder by a first edge of the flexible jacket, adjusting the free play of the flexible jacket, and attaching the flexible jacket to the transfer cylinder by a second edge of the flexible jacket.

In another embodiment, a method of operating a printing press having a transfer cylinder is disclosed. The method comprises printing a substrate, supporting the substrate during at least a portion of the transfer of the substrate through the printing press with a flexible jacket attached to the transfer cylinder with an effective amount of free play, the flexible jacket comprising fluoropolymer, and exposing the substrate to an artificial radiation source comprising at least one of an ultraviolet lamp and an infrared lamp.

In another embodiment, in a printing press having a transfer cylinder for transferring a freshly printed substrate, an anti-marking device is disclosed. The anti-marking device comprises a flexible jacket coupled to a base cover. The flexible jacket comprises fluoropolymer and engages the freshly printed substrate as it is transferred over the transfer cylinder. When the anti-marking device is installed over the transfer cylinder, the base cover is facing the transfer cylinder and the flexible jacket is facing outwards towards the freshly printed substrate. The flexible jacket is coupled to the base cover to promote an effective amount of free play of the flexible jacket when the anti-marking device is installed over the transfer cylinder.

In an embodiment, another method of operating a printing press having a transfer cylinder is provided. The method comprises printing a first substrate and supporting the first substrate during at least a portion of the transfer of the first substrate through the printing press with an anti-marking device comprising a flexible jacket comprised of fluoropolymer to engage the freshly printed substrate as it is transferred over the transfer cylinder and a base cover attached to the flexible jacket at two edges to promote an effective amount of free play of the flexible jacket when the anti-marking device is installed over the transfer cylinder. The method also comprises inserting a non-porous material between the flexible jacket and the base cover from an unattached edge of the anti-marking device and, while the anti-marking device remains installed over the transfer cylinder, cleaning the flexible jacket with one of a cleaning agent and a pressroom solvent. The method also comprises, after cleaning the flexible jacket, printing a second substrate and supporting the second substrate during at least a portion of the transfer of the second substrate through the printing press with the anti-marking device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, a transfer cylinder may be at least partially enclosed by a flexible jacket that is installed over the transfer cylinder with an effective amount of free play. In some contexts, the flexible jacket may be referred to as a net. In some embodiments, a cylinder base cover, hereinafter referred to as a base cover, may be installed over the transfer cylinder, for example a low friction base cover, and the flexible jacket may be installed on the transfer cylinder over the base cover. In some embodiments, the flexible jacket and the base cover may be integrated in an assembly, for example with a gripper edge of the flexible jacket and base cover coupled together and a tail edge of the flexible jacket and the base cover coupled together. The integrated flexible jacket and base cover are manufactured to promote an effective amount of free play for the flexible jacket when the assembly is installed on the transfer cylinder. In other embodiments, however, a base cover may be omitted and the flexible jacket may be installed over the transfer cylinder with no intervening base cover.

In an embodiment, a plurality of flexible jackets may be installed over the transfer cylinder with no intervening base cover, the plurality of flexible jackets being installed with an amount of free play that is effective to promote anti-marking operation of the printing press. In an embodiment, two flexible jackets are installed over the transfer cylinder with no intervening base cover, both flexible jackets being installed with an effective amount of free play for promoting anti-marking operation of the printing press. When the printing press is operated, freshly printed substrates are supported by the flexible jackets installed over the transfer cylinders as the substrates are transferred from station to station within the printing press and finally distributed out of the printing press to a stacking apparatus. In an embodiment, it is thought that the free play of the flexible jacket promotes the flexible jacket expanding when the transfer cylinder rotates, providing a yieldable, cushioning support for the freshly printed substrates and allowing the flexible jacket to adhere to the freshly printed substrates. Further, it is thought that the free play of the flexible jacket promotes the flexible jacket moving with the printed substrate, thereby avoiding marking the freshly printed substrate with spurious inking and/or smearing the ink on the freshly printed substrate.

The several embodiments of the present disclosure contemplate a flexible jacket comprised of a fluoropolymer. Fluoropolymers contemplated by the present disclosure comprise polytetrafluoroethylene (PTFE), fluorinated ethylene propylene (FEP), and perfluoroalkoxy (PFA). PTFE is sold under the trademark TEFLON available from DuPont Corporation and is sold under the trademark XYLAN available from Whitford. FEP is a copolymer of hexafluoropropylene and tetrafluoroethylene. Flexible jackets comprised of fluoropolymer may provide a variety of advantages in different printing press environments including extended life, greater imperviousness to ink penetration, ease of washing and/or cleaning, and greater resistance to deterioration from exposure to artificial radiation sources. Flexible jackets comprised of fluoropolymer may be able to withstand temperatures of about 400 degrees Fahrenheit, which may allow the use of the flexible jackets comprised of fluoropolymer in a wider range of printing environments. While in the following the description will commonly refer to PTFE, it is understood that in various embodiments other fluoropolymers may be used in the place of PTFE.

In an embodiment, the flexible jacket may be coated with a layer of PTFE on a single surface facing the transfer cylinder or on an inward facing surface and on an outward facing surface. In another embodiment, the flexible jacket may be at least partially woven of threads comprising PTFE. For example the flexible jacket may be woven of a mixture of metallic threads and threads comprising PTFE. As another example, the flexible jacket may be woven of a mixture of colored threads and threads comprising PTFE. In another embodiment, the flexible jacket may be woven of threads that comprise PTFE, for example PTFE coated threads. In another embodiment, the flexible jacket may be woven of threads that are manufactured partly from PTFE, for example a thread manufactured of a composition comprising PTFE and another suitable material, for example materials that promote improved structural strength such as tensile strength of the threads, that promote desirable stiffness and/or flexure strength of the flexible jacket, and/or that provide improved anti-static properties of the threads. In another embodiment, the flexible jacket may be woven of threads consisting essentially of PTFE. In another embodiment, the flexible jacket may be a sheet of continuous PTFE or a sheet mesh of PTFE, for example a sheet of PTFE that has holes or other apertures removed from an otherwise continuous sheet of PTFE.

In an embodiment, the flexible jacket 100 may be woven of threads that comprise in the range from 95 percent to 100 percent fluoropolymer (such as PTFE, FEP, and PFA), in the range from 96 percent to 100 percent fluoropolymer, in the range from 97 percent to 100 percent fluoropolymer, in the range from 98 percent to 100 percent fluoropolymer, in the range from 99 percent to 100 percent fluoropolymer, or in the range from 99.5 percent to 100 percent fluoropolymer. In an embodiment, the flexible jacket 100 may be woven of threads comprising fluoropolymer (such as PTFE, FEP, and PFA) and from greater than 0 percent up to about 5 percent other material, from greater than 0 percent up to 4 percent other material, from greater than 0 percent up to 3 percent other material, from greater than 0 percent up to 2 percent other material, from greater than 0 percent up to 1 percent other material, from greater than 0 percent up to 0.5 percent other material. The other materials may be selected to promote structural strength of the threads and/or that promote anti-static properties of the threads, for example carbon and polyester.

In an embodiment, the flexible jacket 100 may be woven of threads that comprise in the range from 95 percent to 100 percent PTFE, in the range from 96 percent to 100 percent PTFE, in the range from 97 percent to 100 percent PTFE, in the range from 98 percent to 100 percent PTFE, in the range from 99 percent to 100 percent PTFE, or in the range from 99.5 percent to 100 percent PTFE. In an embodiment, the flexible jacket 100 may be woven of threads comprising PTFE and from greater than 0 percent up to about 5 percent other material, from greater than 0 percent up to 4 percent other material, from greater than 0 percent up to 3 percent other material, from greater than 0 percent up to 2 percent other material, from greater than 0 percent up to 1 percent other material, from greater than 0 percent up to 0.5 percent other material. The other materials may be selected to promote structural strength of the threads and/or that promote anti-static properties of the threads, for example carbon and polyester.

It is understood that in some embodiments other fluoropolymers may be substituted for PTFE in each of the flexible jackets described above. For example, in an embodiment, the flexible jacket may be coated with fluoropolymer, such as PTFE, FEP, and PFA. In an embodiment, the flexible jacket may be at least partially woven of threads comprising fluoropolymer, such as PTFE, FEP, and PFA. For example the flexible jacket may be woven of a mixture of metallic threads and threads comprising fluoropolymer, such as PTFE, FEP, and PFA. As another example, the flexible jacket may be woven of a mixture of colored threads and threads comprising fluoropolymer, such as PTFE, FEP, and PFA. In an embodiment, the flexible jacket may be woven of threads that comprise fluoropolymer, for example threads coated with fluoropolymer such as PTFE, FEP, and PFA. In another embodiment, the flexible jacket may be woven of threads that are manufactured partly from fluoropolymer such as PTFE, FEP, and PFA, for example a thread manufactured of a composition comprising fluoropolymer and another suitable material, for example materials that promote improved structural strength such as tensile strength of the threads, that promote desirable stiffness and/or flexure strength of the flexible jacket, and/or that provide improved anti-static properties of the threads. In an embodiment, the flexible jacket may be woven of threads that consist essentially of fluoropolymer, for example threads that consist essentially of PTFE, FEP, and PFA. In another embodiment, the flexible jacket may be a sheet of continuous PTFE or a sheet mesh of PTFE, for example a sheet of PTFE that has holes or other apertures removed from an otherwise continuous sheet of PTFE.

Each of these several embodiments of the flexible jacket may have different price points and benefits that make them suitable in some circumstances and not suitable in other circumstances. In an embodiment, the flexible jacket may be about 8 thousandths (0.008) inch thick (about 0.203 mm thick). In another embodiment, the flexible jacket may be about 12 thousandths (0.012) inch thick (about 0.305 mm thick). In other embodiments, the flexible jacket may have a different thickness. In an embodiment, the thickness of the flexible jacket may be determined substantially by the diameter of the threads employed to weave the material comprising the flexible jacket. The diameter of the threads may be selected to achieve a different combination of price point and durability.

Some of the expected benefits of using flexible jackets at least partially comprised of fluoropolymer, such as PTFE, FEP, and PFA, include superior freedom from ink absorption by the flexible jacket, ability to operate in the presence of artificial radiation sources such as ultraviolet lamps and/or infrared lamps, ability to wash the flexible jacket and return to service on the printing press, and extended life of the flexible jacket. Furthermore, the low coefficient of friction of fluoropolymer, such as PTFE, FEP, and PFA, may permit installation of the flexible jacket over the transfer cylinder without installing a base cover over the transfer cylinder, thereby saving the cost of the base cover. In an embodiment it may be desired that the coefficient of friction between the flexible jacket and the transfer cylinder and/or the base cover be less than the coefficient of friction between the flexible jacket and the printed substrate. In an embodiment, the base cover is coated with a fluoropolymer, for example PTFE, FEP, and PFA.

In an embodiment, the base cover has an outwards facing surface (e.g., the surface faces outwards away from the transfer cylinder when the base cover is installed over the transfer cylinder) encrusted with glass beads and/or ceramic beads that are adhered to the base cover. The surface encrusted with glass and/or ceramic beads in an embodiment may be coated and/or covered with silicone, with a fluoropolymer, or other material effective to reduce friction. In an embodiment, the base cover having a bead encrusted surface may be relatively thinner than alternative base covers. In one embodiment, for example, the base cover having a bead encrusted surface may be about 5 thousandths (0.005) inch thick (about 0.127 mm thick). In other embodiments, however, the thickness of the base cover having a bead encrusted surface may have a different thickness, depending on the size of the beads. The relative thinness of the base cover having a bead encrusted surface may have advantages in some printing environments, for example when the clearance between the transfer cylinder and other moving parts of a printing unit, for example an impression cylinder, is limited. In some circumstances, the thinness of the base cover having a bead encrusted surface may promote the installation of two flexible jackets over the base cover. In an embodiment, use of the base cover having a bead encrusted surface may support operating a press unit with only the base cover having a bead encrusted surface on the transfer cylinder, without a flexible jacket, for example when a flexible jacket has been damaged and no replacement flexible jacket is in stock.

As discussed above, the flexible jacket is intended to provide a yieldable, cushioning support for the freshly printed side of a substrate. To achieve this yieldable, cushioning support it is desirable that the flexible jacket be installed and/or adjusted to have an effective amount of slack, looseness, and/or free play with respect to the base cover and/or the transfer cylinder. In an embodiment, the flexible jacket and/or the base cover (when a base cover is employed) may be provided with means for visual alignment to promote adjustment of the effective amount of free play of the flexible jacket. In another embodiment, however, the flexible jacket may not have means for visual alignment. In another embodiment, the base cover may not have means for visual alignment. For further details about visual alignment means in the flexible jacket and/or the base cover, see U.S. patent application Ser. No. 12/258,225 filed Oct. 24, 2008, and entitled "Offset Printing Transfer Cylinder Base Cover with Alignment Stripes for Precision Installation of a Flexible Jacket Cover also with Alignment Stripes" by Howard DeMoore, which is hereby incorporated by reference in its entirety.

The optional means for visual alignment on the flexible jacket and the optional means for visual alignment on the base cover (when a base cover is employed), singly or in combination, may promote repeatable adjustments based on experience. Additionally, the optional means for visual alignment on the flexible jacket and the optional means for visual alignment on the base cover (when a base cover is employed), singly or in combination, may promote ease of conveying instructions from a first experienced press operator to a second less experienced or inexperienced press operator, for example from a remote support center via a telephone call. In some embodiments, a flexible jacket with means for visual alignment may be installed over the transfer cylinder with no intervening base cover, and in this case the visual alignment means on the flexible jacket may be used on their own to promote adjustment of an effective amount of free play.

In an embodiment, a plurality of means for visual alignment may be disposed horizontally on the base cover. As used herein, horizontal indicates that the means for visual alignment on the base cover are substantially parallel to the axis of the transfer cylinder when the base cover is installed over the transfer cylinder. In an embodiment, the means for visual alignment on the base cover are set off from each other at substantially equal distances, for example by about ¾ inch (about 1.9 cm). In other embodiments, however, the means for visual alignment on the base cover may be set off from each other at equal distances but different from about ¾ inch (about 1.9 cm). In an embodiment, a plurality of means for visual alignment may be disposed horizontally on the flexible jacket. As used herein, horizontal indicates that the means for visual alignment on the flexible jacket are substantially parallel to the axis of the transfer cylinder when the flexible jacket is installed over the transfer cylinder. In an embodiment, the means for visual alignment on the flexible jacket are set off from each other at substantially equal distances, for example by about ¾ inch (about 1.9 cm). In other embodiments, however, the means for visual alignment on the flexible jacket may be set off by equal distances but different from about ¾ inch (about 1.9 cm). In other embodiments, the means for visual alignment may be offset by about the same amount for both the base cover and the flexible jacket. The means for visual alignment, of both and/or either of the base cover and the flexible jacket, may be continuous or interrupted. The means for visual alignment may extend horizontally substantially across the whole of the base cover and/or flexible jacket. Alternatively, the means for visual alignment may extend only partially horizontally across the base cover and/or flexible jacket.

The optional means for visual alignment on the base cover may be referred to as visual stripes. The visual stripes on the base cover may be applied as a line segment or a series of line segments (e.g., a dotted line) on the base cover, for example by painting, by lithography, by silk screening, and/or by laser induced marking or scoring, to positively define visual stripes horizontally disposed on the base cover. In another embodiment, different colored threads may be employed to positively define visual stripes horizontally disposed on the base cover. For example, the visual stripes may be defined by periodically weaving in one or more threads having a color that contrasts with the color of the majority of threads making up the woven material of the base cover. In another embodiment, the visual stripes may be defined by periodically weaving in one or more threads having a different diameter than the majority of threads making up the woven material of the base cover. In another embodiment, the base cover may be woven in a lattice pattern that creates substantially horizontal visual stripes in the base cover fabric, for example a herringbone pattern, a checkerboard pattern, a basket weave pattern, and other lattice patterns. As used herein, the term fabric may refer to a woven material constructed of natural fibers and/or synthetic fibers.

Alternatively, the visual stripes on the base cover may be provided by omitting one or more threads from the woven material of the base cover, for example by omitting one or more weft threads or by omitting one or more warp threads from a woven base cover. Removing one or more threads from a woven base cover may be said to negatively define visual stripes. The absence of threads from the woven base cover may be discerned by a print operator by seeing a greater portion of the underlying transfer cylinder through the base cover at the location of the missing threads, for example when the transfer cylinder is a bright metal material such as stainless steel. In some embodiments, a backing strip or backing sheet may be adhered to one side of the base cover to promote discernment by a print operator of the visual stripes. Alternatively, a packing sheet that promotes discernment of the visual stripes may be placed around the transfer cylinder beneath the base cover. The backing strips, backing sheet, and/or packing sheet may have a yellow color, an orange color, a red color, or other color which can be more readily discerned through the negatively defined visual stripe. The backing strips, backing sheet, and/or packing sheet may be a shiny, metallic material. In an embodiment, the transfer cylinder may be painted a color that promotes discernment of the visual stripes by a print operator.

Likewise, the optional means for visual alignment on the flexible jacket may be provided as for the base cover. The means for visual alignment on the flexible jacket may be referred to as visual stripes. The visual stripes on the flexible jacket may be applied as a line segment or a series of line segments (e.g., a dotted line) on the flexible jacket, for example by painting, by lithography, by silk screening, and/or by laser induced marking or scoring, to positively define visual stripes horizontally disposed on the flexible jacket. In another embodiment, different colored threads may be employed to positively define visual stripes horizontally disposed on the flexible jacket. In another embodiment, different diameter threads may be employed to positively define visual stripes horizontally disposed on the flexible jacket. In another embodiment, the flexible jacket may be woven in a lattice pattern that creates substantially horizontal visual stripes in the flexible jacket woven material, for example a herringbone pattern, a checkerboard pattern, a basket weave pattern, and other lattice patterns.

Alternatively, the visual stripes on the flexible jacket may be provided by omitting one or more threads from the woven material of the flexible jacket, for example by omitting one or more weft threads or by omitting one or more warp threads from a woven flexible jacket. Removing one or more threads from a woven flexible jacket may be said to negatively define visual stripes. The absence of threads from the woven flexible jacket may be discerned by a print operator by seeing the base cover through the flexible jacket, for example by seeing a visible stripe on the base cover through the flexible jacket at the area of the missing thread, or by seeing the transfer cylinder through the flexible jacket at the area of the missing thread.

Figure 1A:
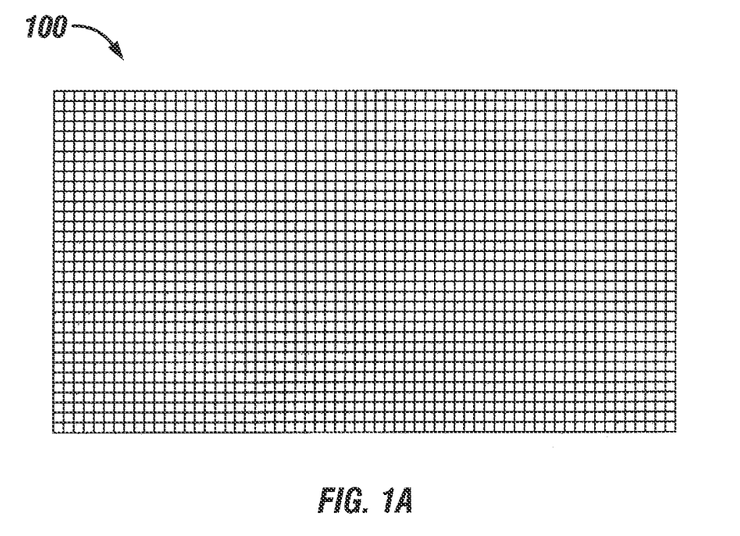
FIG. 1A is a view of a flexible jacket according to an embodiment of the disclosure.
Figure 1B:
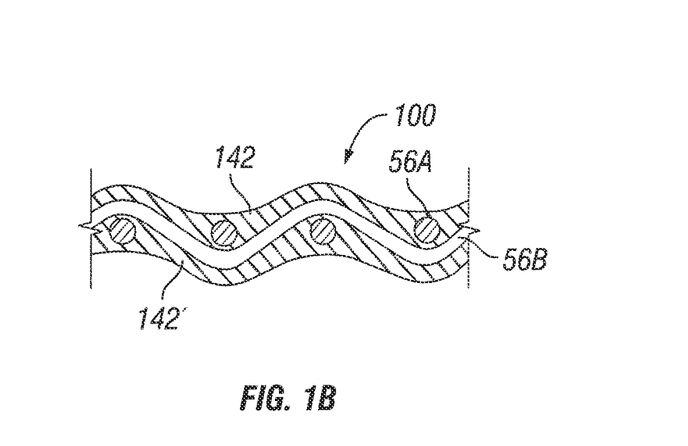
FIG. 1B is a sectional view of a flexible jacket according to an embodiment of the disclosure.

Turning now to FIG. 1A and FIG. 1B, in an embodiment a flexible jacket 100 is a fabric, such as a woven material having warp strands 56A and weft strands 56B, have coating 142 that comprises fluropolymer, such as PTFE, FEP, and PFA. The coating 142 may be applied to a woven material after weaving has been completed, as by immersing the woven material in a solution, for example, of PTFE resin or material or by applying a coating of PTFE on the woven material. In an embodiment, the coated woven material may be heated to a temperature effective to cure the coating of PTFE. The warp and weft (fill) strands 56 may comprise natural fibers or synthetic fibers. In another embodiment, however, the flexible jacket 100 does not have coating 142. In an embodiment, at least some of the warp and weft strands 56 may comprise fluoropolymer, such as PTFE, FEP, and PFA, for example the flexible jacket 100 may be woven partly from thread that is coated with PTFE. In another embodiment, the warp and weft strands 56 may consist of threads that are manufactured partly from fluoropolymer, such as PTFE, FEP, and PFA, for example a thread manufactured of a composition comprising PTFE and another suitable material. In another embodiment, the flexible jacket 100 may be woven from threads consisting essentially of fluoropolymer, such as PTFE, FEP, and PFA. In some of these embodiments, the flexible jacket 100 may be woven both from threads comprising fluoropolymer, such as PTFE, FEP, and PFA, and other threads, such as metallic threads, metal threads, colored threads, bi-component yarns, such as NEGA-STAT, and other threads. A flexible jacket 100 woven from threads comprising fluoropolymer may be able to withstand temperatures up to about 400 degrees Fahrenheit.

Other alternative configurations of flexible jacket 100 will be readily apparent to those skilled in the art based upon the description herein, and these alternative configurations are also contemplated by the present disclosure. Other embodiments of flexible jackets useful in practicing the present invention are disclosed in U.S. Pat. Nos. 5,907,998; 5,979,322; 6,119,597; and 6,244,178, referenced previously and owned by Printing Research Inc. of Dallas, Tex., U.S.A.

In an embodiment, the flexible jacket 100 may be manufactured in a one-step process, wherein the flexible jacket 100 is woven so as to periodically omit one of either one or more of a weft thread or one or more of a warp thread from a continuous sheet of woven material. For example, the process may omit one or more weft threads every about ¾ inch (about 1.9 cm). As another example, the process may omit one or more warp threads every about ¾ inch (about 1.9 cm). Other spacings between omitted threads may be employed. The process may involve weaving the flexible jacket 100 from threads comprising PTFE, for example threads coated with PTFE or threads consisting essentially of PTFE. The process may further include cutting the continuous sheet of woven material into separate sheets sized appropriately to form the flexible jacket 100, which may be referred to as precision cutting the flexible jacket 100. In an embodiment, the process may include coating the woven material with PTFE. The PTFE coating may be applied to the woven material while it is in the continuous form or may be applied to the separately cut sheets of flexible jacket 100.

Figure 2A:
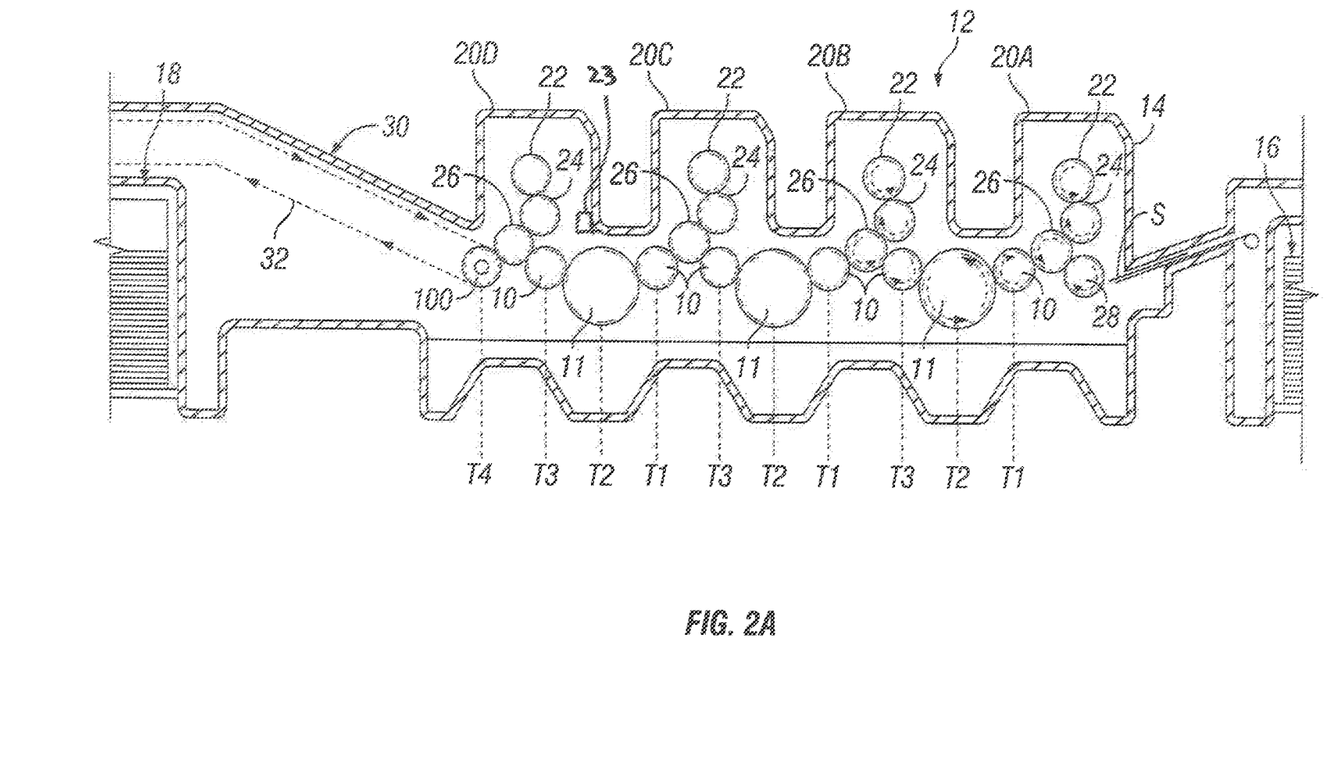
FIG. 2A is a schematic side elevational view showing multiple transfer cylinders installed at substrate transfer positions in a four color rotary offset printing press of a type made by Heidelberg Druckmaschinen Aktiengesellschaft.
Figure 2B:
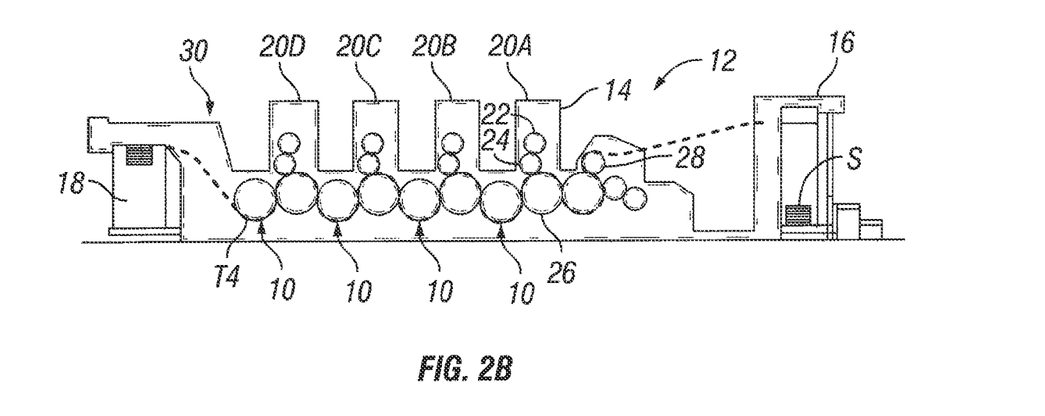
FIG. 2B is a schematic side elevational view showing multiple transfer cylinders installed at substrate transfer positions in a four color rotary offset printing press of the Lithrone Series made by Komori Corp.

For exemplary purposes, the flexible jacket 100 and the optional base cover will be described with reference to the processing of sheet substrates. However, it will be understood that the principles of the disclosure are equally applicable to web substrates. The flexible jacket 100 of the present disclosure and the optional base cover may be used in combination with high-speed printing press equipment of the type used, for example, in offset printing. FIG. 2A shows a typical, four color offset printing press of the type made by Heidelberg Druckmaschinen Aktiengesellschaft, and FIG. 2B shows a four color offset printing press of the Lithrone Series available from Komori Corp. Referring to FIGS. 2A and 2B, such equipment includes one or more transfer cylinders 10 for handling a processed substrate, such as a freshly printed sheet between printing units and upon delivery of the printed sheet to a delivery stacker. The flexible jacket 100 of the present disclosure and the optional base cover are installed on transfer cylinders 10. As used herein, the term "processed" refers to various printing methods, which may be applied to either side or both sides of a substrate, including the application of aqueous inks, protective coatings and decorative coatings. The term "substrate" refers to sheet material or web material.

Use of the present disclosure, in combination with the transfer cylinder 10 at an interstation transfer position (T1, T3) or at a delivery position (T4) in a typical rotary offset printing press 12, is believed to be readily understandable to those skilled in the art. In any case, reference may be made to U.S. Pat. Nos. 3,791,644 and 4,402,267, which disclose details regarding the location and function of a sheet support cylinder in a typical multistation printing press. The present disclosure may, of course, be utilized with conventional printing presses having any number of printing units or stations.

Referring to FIGS. 2A and 2B, the press 12 includes a press frame 14 coupled on its input end to a sheet feeder 16 from which sheets, herein designated S, are individually and sequentially fed into the press. At its delivery end, the press 12 is coupled to a sheet stacker 18 in which the printed sheets are collected and stacked. Interposed between the sheet feeder 16 and the sheet stacker 18 are four substantially identical sheet printing units 20A, 20B, 20C, and 20D which are capable of printing different color inks onto the sheets as they are transferred through the press.

As illustrated in FIGS. 2A & 2B, each printing press is of conventional design, and includes a plate cylinder 22, a blanket cylinder 24, and an impression cylinder 26. Freshly printed sheets S from the impression cylinder 26 are transferred to the next printing press by a transfer cylinder 10. The initial printing unit 20A is equipped with a sheet in-feed roller 28 which feeds individual sheets one at a time from the sheet feeder 16 to the initial impression cylinder 26. In an embodiment, the transfer cylinder 10 may be painted a color that promotes discernment of negatively defined visual stripes in the optional base cover by a print operator.

The freshly printed sheets S are transferred to the sheet stacker 18 by a delivery conveyor system, generally designated 30. The delivery conveyor system 30 is of conventional design and includes a pair of endless delivery gripper chains 32 carrying transversely disposed gripper bars, each having gripper elements for gripping the leading edge of a freshly printed sheet S as it leaves the impression cylinder 26 at the delivery position T4. As the leading edge of the printed sheet S is gripped by the grippers, the delivery gripper chains 32 pull the gripper bars and sheet S away from the impression cylinder 26 and transport the freshly printed sheet S to the sheet delivery stacker 18.

Referring to FIG. 2A, an intermediate transfer cylinder 11 receives sheets printed on one side from the transfer cylinder 10 of the preceding printing unit 20. Each intermediate transfer cylinder 11, which is of conventional design, typically has a diameter twice that of the transfer cylinder 10, and is located between two transfer cylinders 10, at interstation transfer positions T1, T2 and T3, respectively. The impression cylinders 26, the intermediate transfer cylinders 11, the transfer cylinders 10, as well as the sheet in-feed roller 28, are each provided with sheet grippers which grip the leading edge of the sheet to pull the sheet around the cylinder in the direction as indicated by the associated arrows. The transfer cylinder 10 in the delivery position T4 is not equipped with grippers, and includes instead a large longitudinal opening A, which provides clearance for passage of the chain driven delivery conveyor gripper bars. In some printing press installations, an artificial radiation source 23, for example an ultraviolet lamp and/or an infrared lamp, may be mounted to radiate semi-directly or directly onto the interstation transfer positions T1, T2, and T3. The artificial radiation may be employed to cure and/or set the wet ink on printed substrates as they pass through the printing press.

Figure 3:
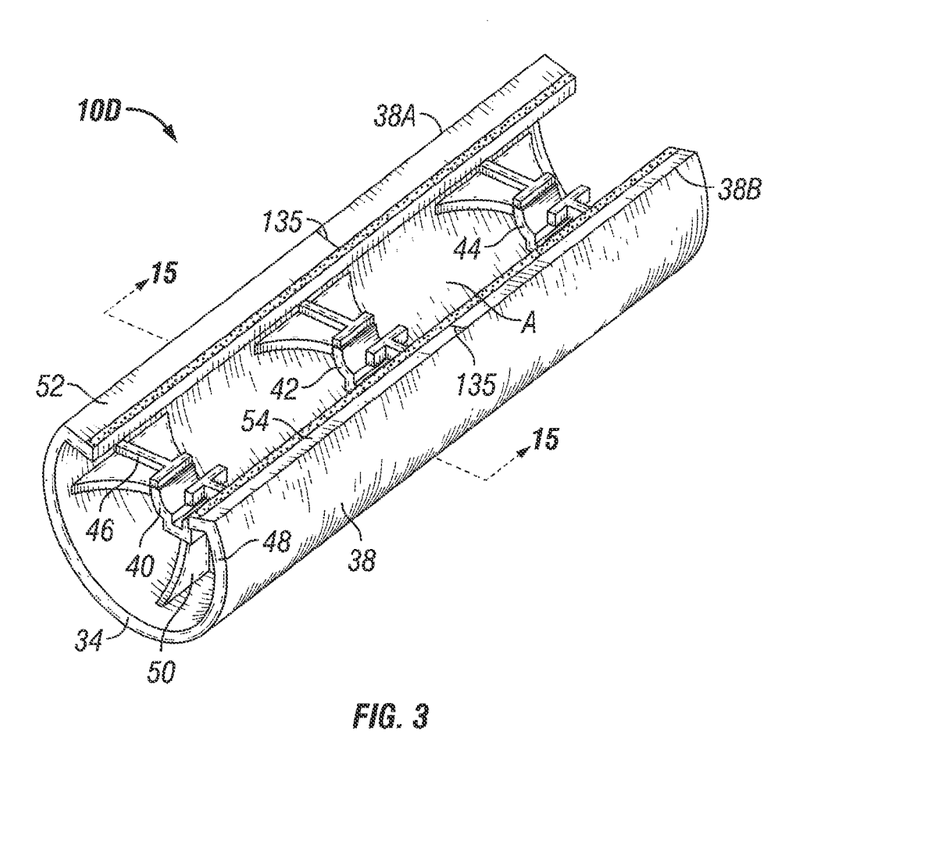
FIG. 3 is a perspective view of a transfer cylinder of a type commonly used on printing presses made by Heidelberg Druckmaschinen Aktiengesellschaft.
Figure 4A:
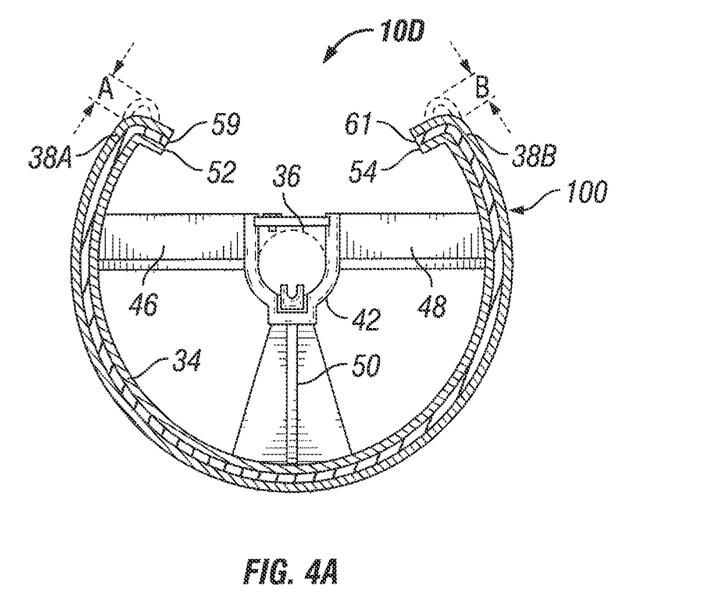
FIG. 4A is a cross-sectional view of a transfer cylinder taken along line 15-15 of FIG. 3 having an integrated, anti-marking cover installed thereon.

Referring now to FIGS. 3 and 4A, a preferred transfer cylinder 10D is shown for use with the Heidelberg printing press of FIG. 2A. The flexible jacket 100 and the optional base cover described herein above are installed on a transfer cylinder 10D on the last printing unit 20D of the press 12 in the delivery position (T4) and has a cylindrical rim 34, which is supported for rotation on the press frame 14 by a rotatable delivery shaft 36. The external cylindrical surface 38 of the cylindrical rim 34 has a gap "A" extending longitudinally along the length of the transfer cylinder 10D and circumferentially between gripper edge 38A and tail edge 38B, respectively. The transfer cylinder 10D is attached to the delivery shaft 36 by longitudinally spaced hubs 40, 42 and 44. Additionally, center alignment marks 135 are formed on the cylinder flanges portions 52, 54 and on the external cylindrical surface 38 of the cylindrical rim 34, as shown in FIG. 3. The purpose of the center alignment marks 135 is to facilitate the precise alignment and attachment of the flexible jacket 100 and/or the optional base cover to the transfer cylinder 10. In an embodiment, a center alignment mark 135 may also be provided on the flexible jacket 100 and/or the optional base cover. The center alignment mark 135 may be distinguished from the visible stripes at least by the fact that the center alignment mark 135 is substantially perpendicular to the axis of the transfer cylinder 10 while the visible stripes are substantially parallel to the axis of the transfer cylinder 10.

The hubs 40, 42, and 44 are connected to the cylindrical rim 34 by webs 46, 48 and 50, and support the transfer cylinder 10D for rotation on the delivery shaft 36 of the printing press 12 in a manner similar to the mounting arrangement disclosed in U.S. Pat. No. 3,791,644. In the embodiment shown in FIG. 3, the delivery cylinder 10D includes opposed cylinder flanges 52, 54, which extend generally inwardly from the surface of the cylindrical rim portion 34. The flanges 52 and 54 include elongated flat surfaces for securing the flexible jacket 100 and the optional base cover as described below. As described herein, transfer cylinders 10 may have alternative configurations for accommodating the various means for releasably attaching the flexible jacket 100 and the optional base cover to the transfer cylinder 10 as described herein.

Figure 4B:
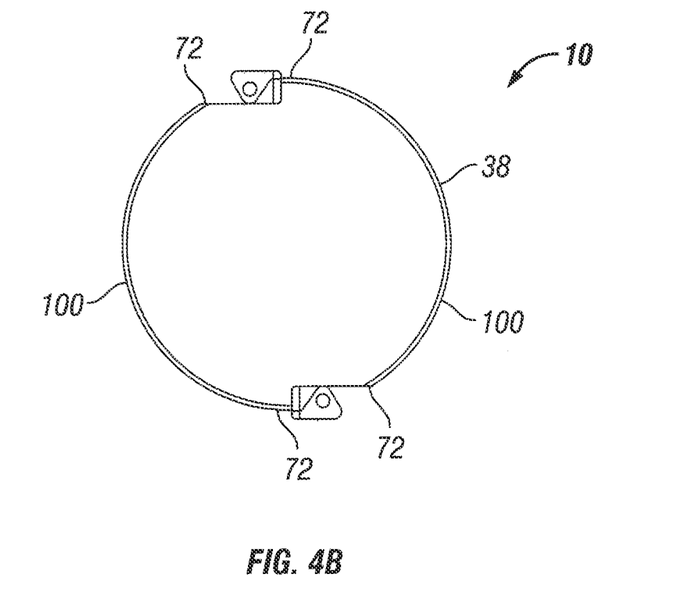
FIG. 4B is a cross-sectional view of a transfer cylinder of a type commonly used on Lithrone Series printing presses made by Komori Corp.

Referring to FIG. 4B, a cross-sectional view of preferred transfer cylinder 10 is shown for use with the Lithrone Series printing press of FIG. 2B. Transfer cylinder 10 is designed and configured to accept a pair of flexible jackets 100, with a first flexible jacket 100 covering about one-half of the cylindrical surface 38 of the transfer cylinder 10 and a second flexible jacket 100 covering about the remaining one-half of the cylindrical surface 38. The flexible jacket 100 is releasably attached to the transfer cylinder 10 at the jacket tail edge and the jacket gripper edge with flat clamp bar 72 held in place with a series of spring loaded screws spaced along the length of the clamp bar 72. In some cases, the flexible jacket 100 is attached by various means including, but not limited to, hook and loop fabric material such as VELCRO that mates adheringly to the flexible jacket 100, an adhesive strip or tape, and other adhering means. For example, the adhesive strip may be coupled on one side to the flexible jacket 100 through one of a heating process and a pressure process. In embodiment, a portion of the adhesive strip may be extruded through an edge of the flexible jacket 100 to couple the adhesive strip to the flexible jacket 100. For example, the extruded portion of the adhesive strip may form end caps or structures like rivets on the opposite side of the flexible jacket 100 to secure the adhesive strip to the flexible jacket 100. The extruded portion of the adhesive strip may partially form an interlocking matrix on the opposite side of the flexible jacket 100 to secure the adhesive strip to the flexible jacket 100. In an embodiment, a portion of the flexible jacket 100 along the edge may be abraded to provide a more suitable mating surface for coupling to a hook and loop fastener, for example VELCRO. In an embodiment, the flexible jacket 100 may be precision cut to promote simple installation and proper free play without adjustment. It is contemplated that the flexible jacket 100, taught by the present disclosure, may provide extended usage cycles relative to known designs for flexible jackets. The flexible jacket 100 may be removed, washed, and reinstalled multiple times before the flexible jacket 100 wears out.

The function and operation of the transfer cylinders 10 and associated grippers of the printing units 20 are believed to be well known to those familiar with multi-color sheet fed presses, and need not be described further except to note that the impression cylinder 26 functions to press the sheets against the blanket cylinders 24 which applies ink to the sheets, and the transfer cylinders 10 guide the sheets away from the impression cylinders 26 with the wet printed side of each sheet facing against the support surface of the transfer cylinder 10. Since each transfer cylinder 10 supports the printed sheet with the wet printed side facing against the transfer cylinder support surface, the transfer cylinder 10 is provided with the flexible jacket 100 and the optional base cover as described herein. The flexible jacket 100 and the optional base cover are releasably attached to the transfer cylinder 10 by means for releasably attaching the flexible jacket 100 and the optional base cover to a transfer cylinder 10. In an embodiment shown in FIG. 4A, the flexible jacket 100 is connected to the transfer cylinder flanges 52 and 54 by the hook and loop (i.e., VELCRO) fastener strips 59, 61. Alternatively, the flexible jacket 100 may be, at least partially, connected to the transfer cylinder 10 using adhesive strip, as described above. In an embodiment shown in FIG. 4A, the flexible jacket 100 may be attached to the transfer cylinder flanges 52 and 54 by mechanical mechanisms, for example by mechanical fasteners such as screws; mechanical take up reels or any other forms of mechanical roll up bars (often referred to collectively as reel cylinders); and the like. Upon installation of the flexible jacket 100 and the optional base cover, the flexible jacket 100 is movable relative to the transfer cylinder 10 and the optional base cover as described previously.

In an embodiment, when installed over the transfer cylinder 10, the flexible jacket 100 may extend across the entire width of the transfer cylinder 10, for example from an operator edge to a gear edge of the transfer cylinder 10. In another embodiment, when installed over the transfer cylinder 10, the flexible jacket 100 may extend across the entire width of the transfer cylinder 10, for example from the operator edge to the gear edge of the transfer cylinder 10, and around behind the operator edge and the gear edge, for example to attach to a hook-and-loop fabric strip adhered on to the inner diameter of the transfer cylinder 10. In another embodiment, when installed over the transfer cylinder 10, the flexible jacket 100 may not extend across the entire width of the transfer cylinder 10, for example from the operator edge to the gear edge of the transfer cylinder 10, but may leave an uncovered margin along one or both of the operator edge and the gear edge of the transfer cylinder. In an embodiment, the base cover 300, likewise, may not extend across the entire width of the transfer cylinder 10, for example from the operator edge to the gear edge of the transfer cylinder 10, but may leave an uncovered margin along one or both of the operator edge and the gear edge of the transfer cylinder 10. In an embodiment, an assembly of the flexible jacket 100 and the base cover may be provided, and the assembly of the flexible jacket 100 and the base cover may not extend across the entire width of the transfer cylinder 10. The narrowing of the flexible jacket 100 and/or the base cover may provide manufacturing cost savings while still providing the desired support for printed substrates as they pass through the printing press 20. The width of the flexible jacket 100 and/or the base cover may be selected to work with the widest substrates that may be printed by the printing unit 20.

The provision of an uncovered margin along one or both of the operator edge and the gear edge of the transfer cylinder 10 may reduce and/or attenuate accumulation of ink, grease, oil, and/or other soiling materials on the flexible jacket 100 and/or the base cover. In some printing units 20, transfer cylinders 10 may throw off and/or accumulate ink, grease, oil, and/or soiling materials, for example by ink propagating from the flexible jacket 100 and/or the base cover and by grease or oil exuding from bearings of the transfer cylinders 10 and/or other moving parts of the printing unit 20. This ink, grease, oil, and/or soiling material may accumulate along the operator edge and/or the gear edge of the transfer cylinder 10. By leaving an uncovered margin, the accumulation of ink, grease, oil, and/or soiling material along the operator edge and/or the gear edge of the transfer cylinder 10 avoids the fouling of the flexible jacket 100 and/or the base cover and saves the trouble of cleaning and/or replacing the flexible jacket 100 and/or the base cover. Additionally, by reducing exposure of the flexible jacket 100 and/or the base cover, the service life of the base cover 100 and/or the base cover may be extended as a result of reduced degradation from contact with damaging compositions, such as ink, grease, and/or soiling material.

In an embodiment, the uncovered margins of the transfer cylinder 10 may be treated to attenuate the movement and/or propagation of the ink, grease, oil, and/or soiling materials inwards from the operator edge and/or the gear edge of the transfer cylinder 10 towards the flexible jacket 100 and/or the base cover. This treatment of the transfer cylinder 10 may also attenuate the movement and/or propagation of the ink, grease, oil, and/or soiling materials outwards to the operator edge and/or the gear edge of the transfer cylinder 10 and attenuate release of the ink, grease, oil, and/or soiling materials to contaminate the floor and/or the air of the pressroom. In an embodiment, the uncovered margins of the transfer cylinder 10 may be abraded or otherwise provided with a rough and/or unsmooth surface to attenuate propagation of ink, grease, oil, and/or soiling materials inwards from the operator edge and/or the gear edge of the transfer cylinder 10. In embodiment, the uncovered margins of the transfer cylinder 10 may be provided with grooves or scoring that comprises troughs and lands, wherein incident ink, grease, oil, and/or soiling materials tend to be constrained within the troughs.

In an embodiment, the uncovered margins of the transfer cylinder 10 may be provided with a surface coating and/or surface treatment that tends to attract and/or retain the ink, grease, oil, and/or soiling materials and to attenuate the propagation of the ink, grease, oil, and/or soiling materials inwards from the operator edge and/or the gear edge. This surface coating and/or surface treatment of the transfer cylinder 10 may also attenuate the movement and/or propagation of the ink, grease, oil, and/or soiling materials outwards to the operator edge and/or the gear edge of the transfer cylinder 10 and attenuate release of the ink, grease, oil, and/or soiling materials to contaminate the floor and/or the air of the pressroom. For example, the uncovered margins of the transfer cylinder 10 may be provided with a surface coating of an oleophilic material. At least some of the inner portions of the transfer cylinder 10 may be provided with a surface coating of oleophobic material. For example, the outermost portion of the uncovered margin of the transfer cylinder 10 may be provided with a surface coating of an oleophilic material while an inner portion of the uncovered margin may be provided with a surface coating of an oleophobic material. The flexible jacket 100 and/or the base cover may be installed over the transfer cylinder 10 inside of outer margins of the transfer cylinder 10 defined by both the oleophilic surface and the oleophobic surface.

In an embodiment, the base cover may be about as wide as the transfer cylinder 10, for example extending from the operator edge to the gear edge of the transfer cylinder 10, while the flexible jacket 100 does not extend from the operator edge to the gear edge of the transfer cylinder 10. The outer edges of the base cover, for example the portions of the base cover not covered by the flexible jacket 100, may have a different composition or a different structure from the portion of the base cover that is covered by the flexible jacket 100. For example, the outer margins of the base cover may be effective to attract and/or to retain ink, grease, oil, and soiling materials and to attenuate the propagation of the same inwards towards the flexible jacket 100. The outer margin of the base cover may comprise an outermost portion of oleophilic surface material. In an embodiment, the outer margin of the base cover may comprise an outermost portion of oleophilic surface material and an inner margin of oleophobic surface material. The outer margin of the base cover may have a rough surface and/or a surface comprising pits, valleys, or other surface irregularities that tend to attenuate the migration and/or propagation of ink, grease, oil, and/or soiling materials inwards to the flexible jacket 100.

Figure 5:
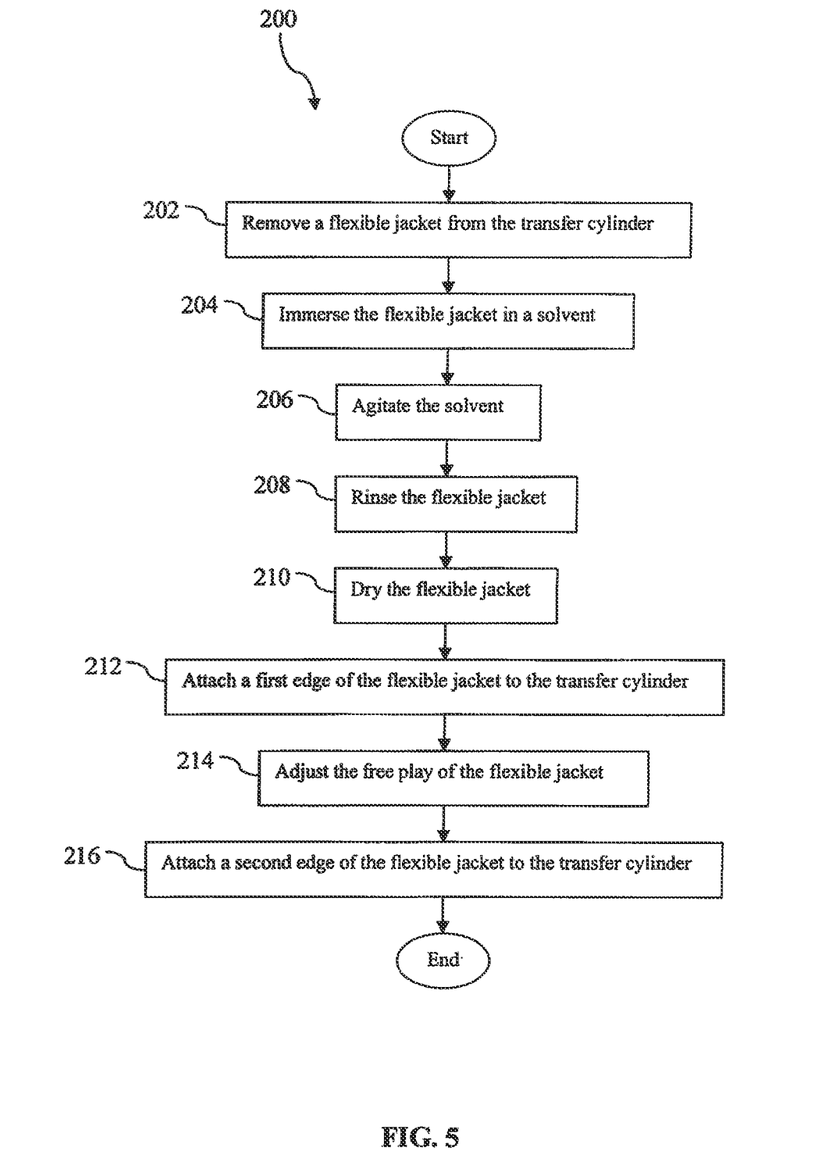
FIG. 5 is a flow chart of a method of maintaining a system.

Turning now to FIG. 5, a method 200 for maintaining the flexible jacket 100 is described. At block 202, the flexible jacket 100 is removed from the transfer cylinder 10. While it is expected that the fluoropolymer (such as PTFE, FEP, and PFA) composition of the flexible jacket 100 will repel ink, nevertheless dried or gummy ink residue may, over many printing impressions, accumulate in the flexible jacket 100. When the flexible jacket 100 becomes ink laden or otherwise soiled, it is expected that the flexible jacket 100 may be removed and washed. At block 204, the flexible jacket 100 is immersed in a solvent. The solvent may be any of a variety of substances that, in combination with the teachings of the present disclosure, may be selected readily by those skilled in the art including an effective mixture of soap and water. The solvent may be common pressroom solvents and/or chemicals such as blanket wash, roller wash, and the like. The solvent may be one or more of alcohol, acetone, benzene, toluene, and other known cleaning solvents. In an embodiment, the flexible jacket 100 may soak in the solvent for a period of time. The soaking in the solvent may be sufficient to loosen and at least partially remove accumulated ink and/or soiling materials. At block 206, the solvent is optionally agitated. By agitating the solvent, the flexible jacket 100 may flex and work the solvent over and/or through the flexible jacket 100, thereby tending to remove ink and/or other soiling matter that has accumulated on and/or in the flexible jacket 100.

At block 208, the flexible jacket 100 is rinsed to remove solvent from the flexible jacket 100 and to flush away loosened ink and soiling matter. In an embodiment, the flexible jacket 100 may be rinsed by being removed from a first vessel containing the solvent and placed in a second vessel containing a substantially clean solution, for example water. The clean solution in the second vessel optionally may be agitated to cause the flexible jacket 100 to flex and work the clean solution over and/or through the flexible jacket 100. In another embodiment, however, the flexible jacket 100 may be treated with a flow of substantially clean solution, for example water, for a period of time. Other rinsing fluids other than water may be used in some embodiments. In an embodiment, the rinsing of block 208 may be repeated an effective number of times to incrementally remove solvent from the flexible jacket 100 and to flush away loosened ink and/or soiling matter. It will be appreciated that the blocks 204, 206, and 208 may be referred to as washing the flexible jacket 100. In an embodiment, the flexible jacket 100 may be washed in a conventional clothes washer, such as may be found in many private residences for washing clothing. At block 210, the flexible jacket 100 is dried. In an embodiment, the flexible jacket 100 may be air dried, such as by hanging up from a line exposed to freely moving air. In another embodiment, the flexible jacket 100 may be dried in a conventional clothes dryer, such as may be found in many private residences for drying clothing. In an embodiment, the flexible jacket 100 comprised of fluoropolymer may be able to withstand temperatures of about 400 degrees Fahrenheit.

At block 212, a first edge of the flexible jacket 100, now washed and dry, is attached to the transfer cylinder 10, for example to the gripper edge of the transfer cylinder 10. At block 214, the free play of the flexible jacket 100 is adjusted. As described above, in an embodiment, an effective amount of looseness in the fit of the flexible jacket 100 over the transfer cylinder 10 is preferred to promote the slight adhesion of the flexible jacket 100 to printed substrates as they transfer through the printing press 12, to promote the flexible jacket 100 moving with the printed substrates without sliding contact, thereby avoiding marking the printed substrate. In an embodiment, alignment means on at least one of the flexible jacket 100 and the optional base cover, for example horizontal visual stripes or partial horizontal visual stripes, may be used to determine the desired amount of free play in the flexible jacket 100. As described above, visual stripes may be provided in a positive manner by painting, silk screening, lithography, or laser induced marking processes or by using a different colored thread woven into the flexible jacket 100 and/or optional base cover. Alternatively, visual stripes may be provided in a negative manner by omitting a thread from the weaving of the flexible jacket 100 and/or optional base cover. At block 216, a second edge of the flexible jacket 100 is attached to the transfer cylinder 10, for example a tail edge of the transfer cylinder 10. The printing press 12 may now be returned to service.

Alternatively, in some embodiments, the flexible jacket 100 may be washed in place, while remaining attached to the transfer cylinder 10. For example, the flexible jacket 100 may be washed with common pressroom solvents and/or chemicals, for example blanket wash and/or roller wash. In an embodiment, the flexible jacket 100 may be washed with alcohol, acetone, benzene, toluene, xylene, and other known cleaning solvents.

Figure 6:
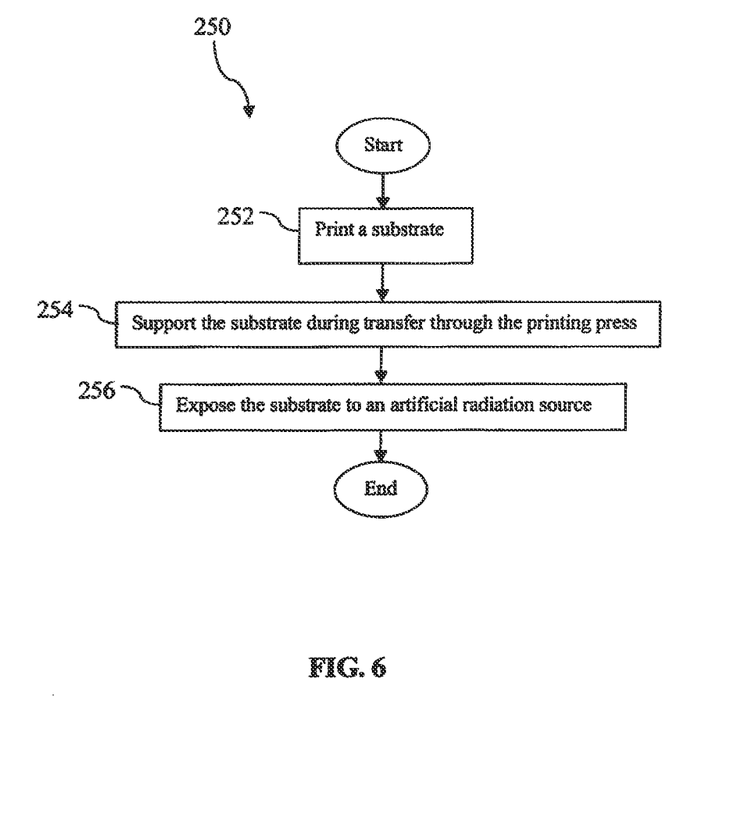
FIG. 6 is a flow chart of a method of printing a substrate.

Turning now to FIG. 6, a method 250 of operating a printing press 12 is described. At block 252, a substrate is printed using the printing press 12. At block 254, as the printed substrate is transferred through the printing press 12, the substrate is supported at least in part by the flexible jacket 100. At block 256, the printed substrate is exposed to an artificial radiation source, for example an ultraviolet lamp and/or an infrared lamp. Further, in an embodiment the artificial radiation source may semi-directly or directly expose the flexible jacket 100 to artificial radiation. Alternatively, in another embodiment, the artificial radiation source may indirectly expose the flexible jacket 100 to artificial radiation, either by pointing the artificial radiation source indirectly towards the transfer cylinder 10 and/or by partial blockage of the artificial radiation source by the printed substrate. In some embodiments, the artificial radiation may be very intense and such as to rapidly degrade other materials less resistant to the artificial radiation than fluoropolymer materials (such as PTFE, FEP, and PFA). The artificial radiation may be sporadic, intermittent, or continuous during press operations. For example, the flexible jacket 100 may be radiated with sufficient energy to raise the surface temperature of the flexible jacket 100 to a temperature in the range from about 90 degrees Fahrenheit to about 125 degrees Fahrenheit, wherein the flexible jacket 100 is able to withstand temperatures up to about 400 degrees Fahrenheit. In an embodiment, the artificial radiation source may be located less than about four feet (about 1.22 m) away but greater than about 2 inches (about 5.1 cm) away from the flexible jacket 100. In an embodiment, the fluoropolymer composition (such as PTFE, FEP, and PFA) of the flexible jacket 100 taught by the present disclosure may enable the flexible jacket 100 to be used in the presence of artificial radiation sources, where the flexible jacket 100 of the prior art may have withered, warped, or otherwise been destroyed, posing a possible fire hazard, in the presence of similar semi-direct or direct artificial radiation.

In some embodiments, the flexible jacket 100 and the optional base cover of the present disclosure may be packaged together and sold as an anti-marking kit for transfer cylinders, for example in a package containing at least one flexible jacket 100 and at least one base cover. In other cases, one base cover may be combined in a package with a plurality of flexible jackets 100, for example six flexible jackets 100, and sold as a kit. In another embodiment, one base cover may be combined in a package with a plurality of flexible jackets 100, for example two flexible jackets 100, three flexible jackets 100, four flexible jackets 100, five flexible jackets 100, or more than six flexible jackets 100.

Figure 7:
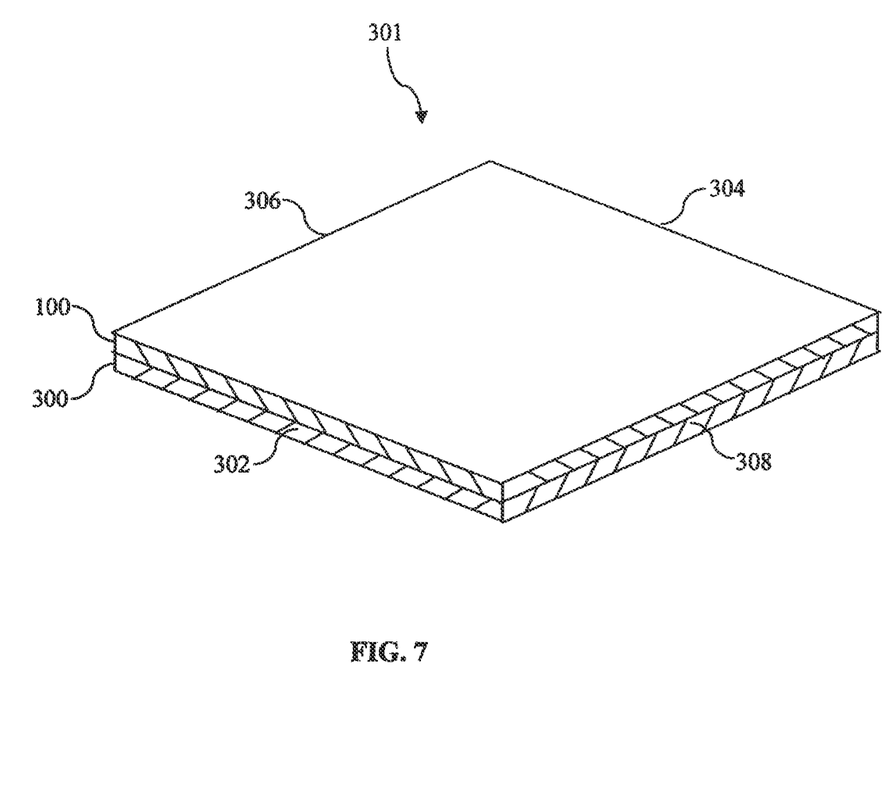
FIG. 7 is an illustration of an anti-marking device integrating a flexible jacket and a base cover according to an embodiment of the disclosure.

Turning now to FIG. 7, an anti-marking device 301 is described. The anti-marking device 301 comprises a base cover 300 as described above attached and/or coupled to the flexible jacket 100 as described above. In an embodiment, the base cover 300 may be removably attached and/or coupled to the flexible jacket 100. In another embodiment, however, the base cover 300 may be permanently attached and/or coupled to the flexible jacket 100. As used herein, the term "permanently attached" means that the flexible jacket 100 and base cover 300, where so attached, do not separate without damaging one or the other. The flexible jacket 100 of the anti-marking device 301 comprises fluoropolymer, such as PTFE, FEP, and PFA. In an embodiment, the flexible jacket 100 of the anti-marking device 301 is woven of threads coated with fluoropolymer, such as PTFE, FEP, and PFA. In another embodiment, the flexible jacket 100 of the anti-marking device 301 is woven of threads consisting essentially of fluoropolymer, such as PTFE, FEP, and PTFA. In yet another embodiment, the flexible jacket 100 of the anti-marking device 301 is coated with fluoropolymer, such as PTFE, FEP, and PFA.

The anti-marking device 301 is for installation on the transfer cylinder 10 for supporting a printed substrate during transfer through the printing press 12. When installed over the transfer cylinder 10, the base cover 300 of the anti-marking device 301 is facing the transfer cylinder 10 and the flexible jacket 100 of the anti-marking device 301 is facing outwards towards the printed substrate. The anti-marking device 301 has a gripper edge 302 and opposing tail edge 304. The anti-marking device 301 has an operator edge 306 that is positioned towards the operator side of the printing press 12 when installed and opposing gear edge 308 that is positioned towards the gear side of the printing press 12 when installed. The anti-marking device 301 may be produced in a variety of sizes and shapes, most often corresponding to the dimensions of the wide variety of commercial transfer cylinders 10 available. The anti-marking device 301 is typically rectangular in shape.

The flexible jacket 100 may be attached and/or coupled to the base cover 300 in a variety of ways. The flexible jacket 100 may be attached to the base cover 300 along only one edge, for example along only the gripper edge 302 or along only the tail edge 304. The flexible jacket 100 may be attached to the base cover 300 along two edges, for example along the gripper edge 302 and the tail edge 304 or along the gear edge 308 and the operator edge 306. Alternatively, in another embodiment, the flexible jacket 100 may be attached to the base cover 300 by three or four of the gripper edge 302, the tail edge 304, the operator edge 306, and the gear edge 308. The attachment along one or more of the edges may be partial, that is the points of attachment may extend along a portion of an edge and not extend from end-to-end of an edge.

The several alternative configurations may have different advantages that recommend their selected use in different environments. The anti-marking device 301 wherein the flexible jacket 100 is permanently attached to the base cover 300 at least partially along one edge only, for example, may promote ease of cleaning the base cover, for example when an unwanted solvent is spilled on the anti-marking device 301. For example, in the event of a solvent spill, the unattached edge of the flexible jacket 100 of the anti-marking device 301 may be lifted free of the base cover 300 and the transfer cylinder 10, providing access to clean the base cover 300. After cleaning the base cover 300, the flexible jacket 100 may be reattached to the transfer cylinder 10 with the effective amount of free play. The unattached edge of the anti-marking device 301 may be secured to the transfer cylinder 10 by hook and loop fasteners, for example VELCRO, or other attachment means.

The anti-marking device 301 wherein the flexible jacket 100 is attached to the base cover 300 at least partially along two opposing edges, for example along the gripper edge 302 and along the tail edge 304, may promote cleaning the flexible jacket 100. In an embodiment, the flexible jacket 100 may be permanently attached to the base cover 300. For example, a non-porous material may be inserted from an unattached edge, for example from the operator edge 306 or the gear edge 308, between the flexible jacket 100 and the base cover 300 and the flexible jacket 100 may be washed in place over the transfer cylinder 10 with any appropriate cleaning agent or pressroom solvent. For example, the flexible jacket 100 may be washed with common pressroom solvents and/or chemicals, for example blanket wash and/or roller wash. In an embodiment, the flexible jacket 100 may be washed with alcohol, acetone, benzene, toluene, xylene, and other known cleaning solvents. The flexible jacket 100 may be washed with a mixture of soap and water. The non-porous material may reduce the chances that the cleaning agent and/or pressroom solvent may soil and/or damage the base cover 300.

In an embodiment, a method of operating the printing press 12 having a transfer cylinder 10 comprises printing a first substrate and supporting the first substrate during at least a portion of the transfer of the first substrate through the printing press 12 with the anti-marking device 301 comprising the flexible jacket 100 comprised of fluoropolymer to engage the freshly printed substrate as it is transferred over the transfer cylinder 10 and the base cover 300 attached to the flexible jacket 100 at two edges, for example at the gripper edge 302 and at the tail edge 304, to promote an effective amount of free play of the flexible jacket 100 when the anti-marking device 301 is installed over the transfer cylinder 10. The method also comprises inserting a non-porous material between the flexible jacket 100 and the base cover 300 from an unattached edge of the anti-marking device 301, for example from one of an operator edge 306 and a gear edge 308, and, while the anti-marking device 301 remains installed over the transfer cylinder 10, cleaning the flexible jacket 100 with one of a cleaning agent and a pressroom solvent. The method also comprises, after cleaning the flexible jacket 100, printing a second substrate and supporting the second substrate during at least a portion of the transfer of the second substrate through the printing press 12 with the anti-marking device 301.

In an embodiment, the flexible jacket 100 may be attached to the base cover 300 by stitching, adhesive, thermal bonding, crimp strips, male-female fasteners, brads, rivets, tension strips, staples, or combinations thereof. The flexible jacket 100 may be attached to the base cover 300 so as to provide the desirable effective amount of free play in the flexible jacket 100 when the anti-marking device 301 is installed on the transfer cylinder 10, thereby relieving an operator and/or a pressman of the need to adjust the free play of the flexible jacket 100 when attaching the flexible jacket 100 to the transfer cylinder 10 as described above. The anti-marking device 301 may speed the replacement of the flexible jacket 100 by relieving the operator and/or pressman of the step of adjusting the free play of the flexible jacket 100. Additionally, the anti-marking device 301 may overcome the problem of an inexperienced, and/or an inattentive operator, and/or pressman installing the flexible jacket 100 with either excessive or insufficient free play.

In an embodiment, two or more flexible jackets 100 may be attached to the base cover 300 of the anti-marking device 301. As the top-most flexible jacket 100 wears out, the top-most flexible jacket 100 may be removed from the anti-marking device 301 and then printing using the next layer of flexible jacket 100 may resume. Further details of multiple layer jackets may be found in U.S. patent application Ser. No. 12/343,484 filed Dec. 24, 2008, entitled "Multiple Layer Anti-marking Jackets and Methods of Using in Offset Printing," by Howard DeMoore et al., which is hereby incorporated by reference.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What we claim is:

1. A method of operating a printing press having a transfer cylinder, comprising:
    printing a substrate;
    supporting the substrate during at least a portion of the transfer of the substrate through the printing press with a flexible jacket attached to the transfer cylinder without being taut around the transfer cylinder, the flexible jacket comprised of fluoropolymer;
    exposing the substrate and the flexible jacket to an artificial radiation source comprising at least one of an ultraviolet lamp or an infrared lamp; and
    raising the temperature of the flexible jacket to a temperature greater than about 90 degrees Fahrenheit and less than about 400 degrees Fahrenheit.

2. The method of claim 1, wherein the fluoropolymer comprises at least one of polytetrafluoroethylene (PTFE), fluorinated ethylene propylene (FEP), and perfluoroalkoxy (PFA).

3. The method of claim 1, wherein the fluoropolymer is polytetrafluoroethylene (PTFE).

4. The method of claim 1, wherein the flexible jacket is removably attached to the transfer cylinder.

5. The method of claim 1, wherein the flexible jacket is able to withstand temperatures up to about 400 degrees Fahrenheit.

6. The method of claim 1, wherein the artificial radiation source is located less than about four feet from the flexible jacket and more than about two inches from the flexible jacket.

7. The method of claim 1, wherein the flexible jacket is woven at least partly from threads manufactured using fluoropolymer.

8. The method of claim 1, wherein the flexible jacket is woven at least partly from threads comprised of at least about 98 percent polytetrafluoroethylene (PTFE).

9. The method of claim 1, wherein the artificial radiation source indirectly exposes the substrate.

10. The method of claim 1, wherein the artificial radiation source directly exposes the substrate.

11. The method of claim 1, wherein the artificial radiation source exposes the substrate to the artificial radiation sporadically.

12. The method of claim 1, wherein the artificial radiation source exposes the substrate to the artificial radiation substantially continuously during operation of the printing press.

* * * * *